United States Patent [19]

Newell et al.

[11] 3,867,255

[45] Feb. 18, 1975

[54] PROCESS OF MAKING YEAST PROTEIN ISOLATE HAVING REDUCED NUCLEIC ACID CONTENT

[75] Inventors: Jon Albert Newell, Webster Groves; Robert Dudley Seeley, Crestwood; Ernest Aleck Robbins, High Ridge, all of Mo.

[73] Assignee: Anheuser-Busch, Incorporated, St. Louis, Mo.

[22] Filed: Nov. 29, 1972

[21] Appl. No.: 310,468

[52] U.S. Cl. ............... 195/5, 260/112 R, 426/60, 426/148, 426/204, 426/212
[51] Int. Cl. ............................ A23j 1/18, A23l 1/28
[58] Field of Search ............ 426/60, 148, 364, 204, 426/212, 229; 260/112 R; 195/5

[56] References Cited
UNITED STATES PATENTS

| | | | |
|---|---|---|---|
| 3,268,412 | 8/1966 | Champagnat et al. | 195/3 |
| 3,585,179 | 6/1971 | Samejima et al. | 260/112 |
| 3,615,654 | 10/1971 | Ayukawa et al. | 99/9 |
| 3,634,194 | 1/1972 | Frankenfeld et al. | 195/28 |
| 3,681,195 | 8/1972 | Suekane et al. | 195/4 |
| 3,718,541 | 2/1973 | Kalina | 195/28 |
| 3,725,075 | 4/1973 | Muroi et al. | 99/14 |

*Primary Examiner*—James R. Hoffman
*Attorney, Agent, or Firm*—Gravely, Lieder & Woodruff

[57] ABSTRACT

This disclosure relates to a process of making a yeast protein isolate of low nucleic acid content. The process involves adding exogenous nuclease to a solubles fraction separated from a mass of ruptured yeast cells to hydrolyze the nucleic acid. The preferred source of exogenous nuclease is malt sprouts.

17 Claims, 1 Drawing Figure

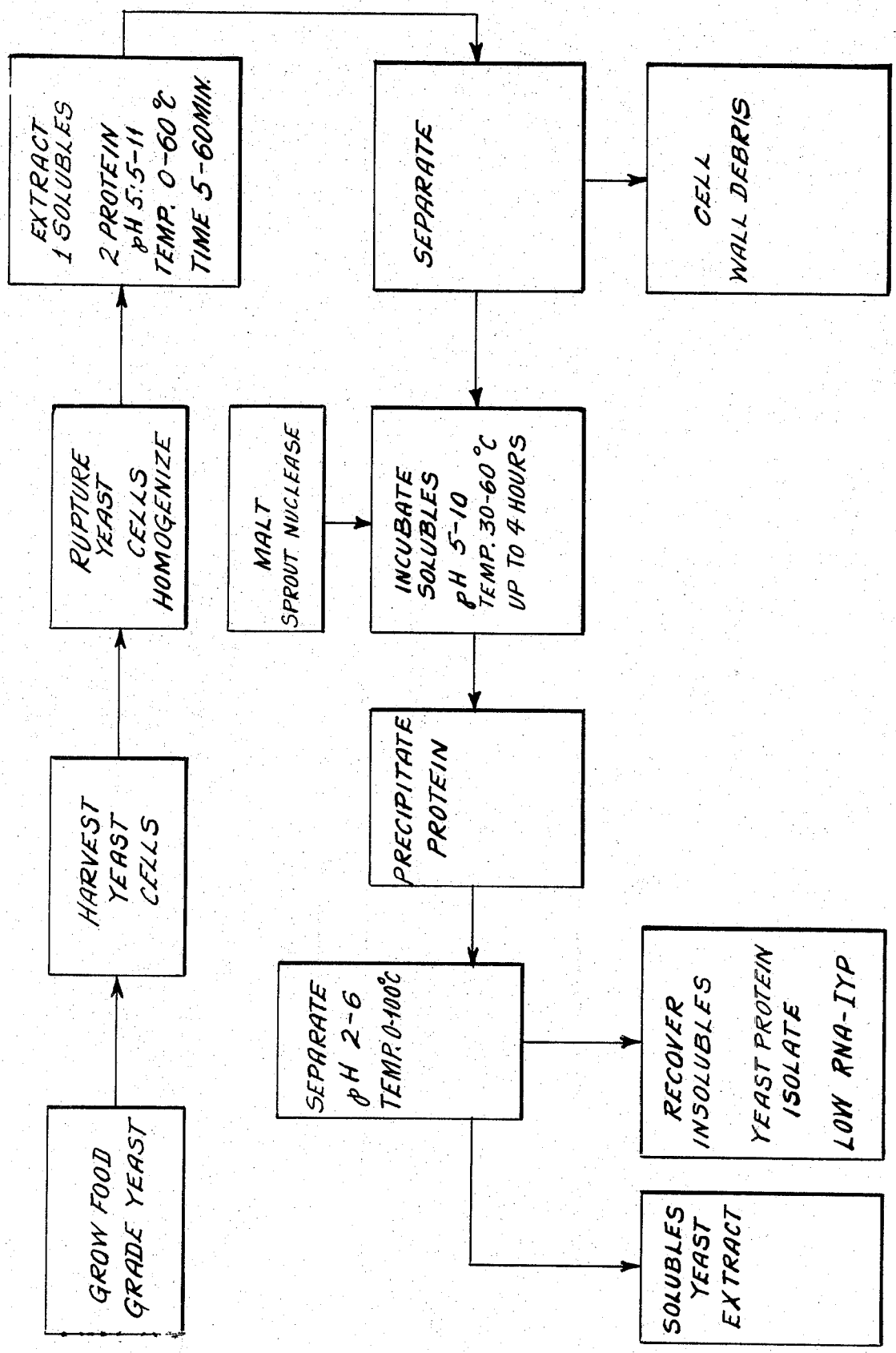

PROCESS OF MAKING YEAST PROTEIN ISOLATE HAVING REDUCED NUCLEIC ACID CONTENT

BACKGROUND OF THE INVENTION

There has been considerable information published on the production of microbial protein. The term "microbial protein" has developed two meanings. kilogram meaning connotates the whole cell, in which the protein is contained within the confines of the cell wall and therefore is relatively non-functional. The other meaning connotates a protein isolated as a separate entity from the microbe. In either case, for human nutrition, the nucleic acid content of the protein product should be reduced to below 9% of a substantial amount of yeast protein is used in the human diet. The Recommended Daily Allowance of The Food and Nutrition Board, National Research Council for protein is 65 grams per day for a 70 ilogram adult male and The Protein Advisory Group of the United Nations System recommends that the amount of nucleic acid ingested per day from microbial protein should be less than two grams. Therefore, the nucleic acid content of the protein should be less than three percent if these criteria are to be met when yeast protein is the only source of dietary protein. The nucleic acid content should be less than 6% if the yeast protein constitutes 50% of the dietary protein.

The nucleic acid content of yeast cells such as *Candida utilis* and *Saccharomyces cerevisiae* is about 12 to 15 grams of nucleic acid per 100 grams of crude protein. Crude protein is calculated in this application as the Nitrogen (N) content multiplied by 6.25. The protein isolated from these cells also contains 12 to 15 grams nucleic acid per 100 grams of crude protein. Thus, the nucleic acid content must be reduced substantially, by four to five fold, before the protein can be considered as acceptable as the sole source of protein for human nutrition. The nucleic acid of yeast is mainly ribonucleic acid or RNA, and in this application these terms will be used interchangeably.

The reduction of the nucleic acid content can be accomplished by the hydrolysis of the nucleic acid within the cell to fragments of such size that the fragments can be diffused from the cell away from the protein. It is known that the enzyme, nuclease, is present in certain yeast cells and that nuclease hydrolyzes or breaks up nucleic acid molecules to smaller fragments. It also is known in the art that the hydrolysis of nucleic acids within the cell can be accomplished by a multi-step heating process to activate the self-contained or endogenous nuclease to produce cells containing two to three grams of nucleic acid per 100 grams of protein. Nucleic acid also can be hydrolyzed by exposing the cell to an external nuclease.

In either of these procedures, two fractions are obtained. One fraction is the cell containing a reduced content of nucleic acid. The other fraction is the surrounding medium containing nucleic acid fragments and other diffusable material. One disadvantage of these processes is that the protein remains within the cell in a non-functional form for food use. Another disadvantage is that the processes by which the cell wall is made permeable to the nucleic acid fragments also severely decrease the ability of the cell to be ruptured to allow the protein to be harvested. A further disadvantage is the difficulty in controlling the endogenous protease which hydrolyzes the protein, thereby complicating protein recovery.

When yeast cells are ruptured by any method, a cellular debris fraction and a soluble cytoplasmic constituent fraction are obtained. These fractions can be separated by centrifugation or filtration. Among the soluble cytoplasmic constituents are the nucleic acid and the protein, either individually or in conjugation. In any situation, recovery of the protein by isoelectric precipitation results in a protein product with an undesirable content of nucleic acid.

Chargaff, in Vol. I, *The Nucleic Acids*, states that ribonucleic acid can be hydrolyzed by the action of 1 N HCl for one hour at 100°C., or by the action of 0.1 N NaOH at 100°C. The application of such acidic or alkaline conditions to the microbial cytoplasmic constituents resulting from yeast cell rupture results in the hydrolysis of the nucleic acid. However, these conditions or even less drastic conditions result in a decrease in protein recovery, the development of undesirable flavors, and a decrease in nutritional value of the protein.

Hydrolysis of the nucleic acids by enzymatic methods allows the use of much milder conditions than those necessary for the chemical methods of hydrolysis. As previously mentioned, the enzyme, nuclease, is known to hydrolyze nucleic acids. Several sources of nuclease have been described in the literature. However, the nuclease preparations must meet certain criteria, namely, the preparation must be free of secondary enzyme systems (such as protease, which would cause a decrease in protein recovery). Furthermore, to be of commercial interest, the nuclease preparation must be readily available at a reasonable cost and the nuclease must be of food grade acceptability. None of the known nuclease preparations meet these criteria.

Laufer and Gutcho in *Biotechnology and Bioengineering*, Vol. X, 1257–1275 (1968), report that various plant seedlings and rootlets contain nuclease. Also in U.S. Pat. No. 3,459,367 a nuclease extracted from plant seedlings was used to hydrolyze commercial deoxyribonucleic and ribonucleic acid preparations to 5'-nucleotides which are recovered by alcohol precipitation and ion exchange fractionation.

We have discovered a process by which the nuclease contained in plant seedlings and rootlets (namely, malt sprouts and acrospires) can be utilized to prepare a protein product from yeasts, said protein product having a low content of nucleic acid. Furthermore, the desired protein product is obtained in good yield. A still further advantage is that the mild process conditions do not decrease the nutritional quality of the protein.

SUMMARY OF THE INVENTION

This invention comprises a process of making low nucleic acid isolated yeast protein by adding exogenous nuclease to a solubles portion separated from a mass of ruptured yeast cells.

DETAILED DESCRIPTION

Preparation of Nuclease:

Nuclease is contained in malt sprouts and acrospires. Some of the nuclease can be extracted from whole sprouts, but the extraction of the enzyme is facilitated by reduction in the particle size either by dry milling or by wet milling. The extraction of whole sprouts at 5% solids, 25°C. for 15 hours solubilized 650 nuclease units per gram of sprouts. Under the same conditions, 1,080 units was extracted per gram of pin-milled sprouts. Increasing the temperature of extraction of the whole and pin-milled sprouts to 50°C. or 60°C. did not increase the extraction of the nuclease.

The wet milling of malt sprouts and acrospires can be accomplished in an homogenizer such as a Waring blender. The nuclease content of the malt sprouts and acrospires is determined by summing the nuclease content of repeated washes. The distribution of nuclease among the washes is shown in Table I. These data show that almost all of the nuclease is extracted in two washes. Following is the assay method used by us.

ASSAY OF NUCLEASE ACTIVITY IN MALT SPROUT EXTRACT

Each assay tube contains the following:
Enzyme Solution:
  1 ml. 0.1 M glycine/NaOH buffer pH 9.0 containing 9m Molar $ZnCl_2$
  1 ml. 3% Sigma sodium RNA from *C. utilis* in a total volume of 3.0 ml.

The assay tubes along with tubes containing no RNA or no enzyme are incubated 30 minutes at 50°C. After incubation, 3 ml. of 0.25% uranyl acetate in 2.5% $HClO_4$ are added, the tubes are chilled in ice water and centrifuged. An aliquot of the supernatant solution is diluted 1:100 with water and $A_{260}$ is recorded.

The net $A_{260}$ nm ($A_{260}$nm for complete system minus the sum of $A_{260}$ nm of the RNA blank and the enzyme blank) is calculated.

One unit of enzyme activity gives a net change at $A_{260}$ nm of 0.01 absorbance unit under the above assay conditions.

TABLE I

Nuclease Content and Extractability of Malt Sprouts and Acrospires

Malt sprouts and acrospires were homogenized for ten minutes in 20 vol. of water. The homogenate was filtered through cheesecloth to give a residue and a crude filtrate. The residue was resuspended, homogenized, and again filtered through cheesecloth. The process was repeated. The crude filtrates were assayed for nuclease activity. The nuclease content of the crude fractions were summed to obtain the nuclease units per gram of sprouts.

| Source | Anheuser-Busch Malt Sprouts | Manitowoc Malt Sprouts | Acrospires |
|---|---|---|---|
| | Units Extracted per Gram | | |
| | Crude Filtrate | Crude Filtrate | Crude Filtrate |
| First Extraction | 740 | 1485 | 1046 |
| Second Extraction | 580 | 368 | 290 |
| Third Extraction | 25 | 78 | 41 |
| Total | 1345 | 1931 | 1377 |

The effect of sprout concentration, volume, and time of homogenization on the extraction of nuclease units is shown in Table II.

TABLE II

Conditions Affecting the Extractability of Malt Sprout Nuclease in the Waring Blendor Malt sprouts were suspended in 20 parts (W/W) of water, slurried, and drained to constitute washed sprouts. The washed sprouts were suspended in 5, 10, 15 and 20 parts of water (dsb), transferred to a one gallon Waring Blendor and homogenized for 1, 2, 3, 4 and 5 minutes at full speed. The homogenate was diluted to 5% dsb (20 parts of water total), stirred two minutes and centrifuged at high speed. The supernates were analyzed for nuclease.

| g Dry Sprouts | ash | Volumes Blend | Volumes Extrn. | ml. in Blendor | Nuclease Units Recovered in Clear Supernate/g Sprouts Time(minutes) 1 | 3 | 5 | Nuclease Units Recovered Per Blendor (× 1000) Time(minutes) 1 | 3 | 5 |
|---|---|---|---|---|---|---|---|---|---|---|
| 350 | 20 | 10 | 20 | 3500 | 357 | 1002 | 1058 | × | 350 | 370 |
| 233 | 20 | 15 | 20 | 3500 | × | 1071 | 1149 | × | 250 | 268 |
| 175 | 20 | 20 | 20 | 3500 | × | 1132 | 1148 | × | 198 | 201 |
| 300 | 20 | 10 | 20 | 3000 | 548 | 940 | × | 165 | 282 | × |
| 75 | 20 | 20 | 20 | 1500 | 750 | 1070 | 1080 | 56 | 80 | 81 |
| 75 | 20 | 10 | 20 | 750 | × | 1050 | × | × | 79 | × |
| 75 | 20 | 5 | 20 | 375 | 434 | 840 | 940 | 33 | 63 | 71 |

The data of Table II show that maximum extraction occurs at a dilution of 15–20 volumes of water (i.e., at 5–6.7% solids) with a blend time of 5 minutes. Considering that the data of Table I showed that the St. Louis malt sprouts contained 1,345 units per gram, then from Table II, it can be seen that 1,149 ÷ 1,345 = 0.85 of the nuclease can be obtained in a clear solution under the operating conditions set forth in Table II.

The effects of pH and temperature on the stability of nuclease from a homogenate of washed sprouts were measured over the pH range of 3.5–9.5, and temperature of 30°, 50° and 60°C. using the previously described nuclease assay. We found that pH 4.5–5.5 is the optimum for retention of nuclease activity when the solutions of nuclease are incubated in the absence of added substrate of zinc. Nuclease activity is rapidly lost at 60°C. but not at 50°C.

DESCRIPTION OF DRAWING

The attached drawing is a flow sheet of the entire process.

Preparation of Alkali Extract of Yeast

Yeast biomass is produced by methods known to those versed in the art. The yeast must be of food grade. The biomass is harvested by centrifugation or filtration and water washed. Sometimes dilute alkali is incorporated in the wash to remove adhering color and taste bodies. The yeast cells are ruptured by any of several known methods such as high pressure homogenization (our preferred method), attrition in a sand or colloid mill, sonic disintegration, repeated freeze-thaw cycles, lytic enzymes and the like. The main consideration is to rupture the majority of cells under such conditions that the majority of the protein remains in the soluble state, but can be harvested in a later step. The ruptured cell system (homogenate) may be diluted, warmed and pH adjusted to favor processability.

The homogenization conditions are: pressure 5,000–15,000 psig.; passes 1–5; temperature 0°–50°C. The preferable conditions are: 1–3 passes at a temperature of 0°–10°C.; and the ambient ph of the yeast (pH 4.5–6.5).

The homogenate is separated by centrifugation and/or filtration into a cell wall residue and an extract, usually referred to as the alkali extract. The development of a yeast glycan from the cell wall residue is described on a copending application (Yeast Glycan and Process of Making Same) Ser. No. 310.452, filled Nov. 29, 1972.

If the protein is recovered by isoelectric precipitation at this stage (after separation of the cell wall residue), then the protein will contain undesirably high levels of nucleic acid. Such preparations are usually referred to as a full RNA-IYP. However, if the alkali extract is treated with a nuclease before recovery of the protein in accordance with the conditions of this invention; then the recovered protein product has a desirably low level of nucleic acid and is referred to as low RNA-IYP. When the alkali extract is treated in accordance with this invention, the low RNA protein is insolubilized and may be recovered with or without additional pH adjustment. An added benefit of this invention is that the mild conditions do not decrease the nutritive quality of the protein.

The separation of the low RNA-IYP results in a protein sludge and the soluble cytoplasmic constituents. The soluble cytoplasmic constituents contain the nucleic acid fragments, protein fragments, glycogen, and all of the metabolic intermediates including the vitamins. The soluble cytoplasmic constituents constitute a valuable fraction of the total microbial system and will be described in separate patent applications. The harvested low RNA-IYP may be water washed to remove adhering cytoplasmic material. The washed protein product may be dried to a powder by spray drying, drum drying, freeze drying, and the like.

The composition of the recovered low RNA-IYP is as follows: about 25% to about 85% protein; about 0.5% to about 9% RNA (preferably about 0.5% to about 5%, and ideally less than about 3% RNA); about 7 to about 15% lipid; about 1% to about 5% ash; about 5% to about 20% carbohydrate; and about 0% to about 1% fiber.

Cell rupture, extraction of solubles, and processability are affected by pH, temperature, time, solids concentration, and homogenizer efficiency. Our usual method of measuring the extent of cell rupture is to determine the amount of nitrogen that becomes soluble, i.e.:

% N Extractability = 100 × (g N in supernate after centrifugation/g N in homogenate before centrifugation)

A *Candida utilis* biomass after washing has a pH 4.5–5.5. The biomass is chilled, then passed through a Manton-Gaulin homogenizer to a chilled receiver. The process is repeated for a total of three passes. At least three passes are needed to obtain maximum cell rupture. In practice, the biomass is homogenized at the ambient pH of the yeast, namely 5.0–5.5. Cell rupture can also be achieved at higher pH's up to at least pH 9.5, but the subsequent separation of the cell wall residue from the solubles becomes more difficult.

The effects of pH, solids concentration, and homogenizer efficiency upon the N extractability of *Candida utilis* and on *Saccharomyces cerevisiae* are shown in Tables IIIA and IIIB.

TABLE IIIA

Effect of Extraction pH, Solids Level, and Homogenizer Efficiency Upon Nitrogen Extractability of *Candida utilis*

Chilled suspensions of *Candida utilis* at pH 5.0–5.5, 7–10% solids were homogenized by means of Manton-Gaulin homogenizer. The chilled homogenate was recycled through the homogenizer at 8000 psig. repeatedly to give one, two, three or four pass homogenate. The homogenate was diluted with up to 2.0 parts of water, and adjusted in pH. The diluted homogenates were incubated for 30 minutes at 50°C. and then centrifuged. The nitrogen contents of the diluted homogenate, and of the supernate were measured by the Kjeldahl method. % N extractions were calculated.

| pH of Extraction | Solids Content | No. of Passes | % Nitrogen Extracted | Separation of Cell Wall Residue and Solubles |
|---|---|---|---|---|
| 7 | 2.5 | 3 | 76 | Good |
| 8 | 2.5 | 3 | 74 | Good |
| 9 | 2.5 | 3 | 84 | Good |
| 10 | 2.5 | 3 | 82 | Good |
| 11 | 2.5 | 3 | 80 | Good |
| 9.5 | 2.5 | 1 | 70 | Good |
| 9.5 | 2.5 | 2 | 83 | Good |
| 9.5 | 2.5 | 3 | 89 | Good |
| 9.5 | 2.5 | 4 | 91 | Good |
| 9 | 2.4 | 3 | 83 | Good |
| 10 | 2.4 | 3 | 82 | Med. |
| 11 | 2.4 | 3 | 78 | Med. |
| 12 | 2.4 | 3 | 85 | Med. |
| 9 | 6.9 | 3 | 64 | Poor |
| 10 | 6.9 | 3 | 59 | Poor |
| 11 | 6.9 | 3 | 54 | Poor |
| 12 | 6.9 | 3 | 51 | Poor |

TABLE IIIB

Effect of Extraction pH, Temperature, Time, Solids Content, and Homogenizer Efficiency Upon the Nitrogen Extractability of *Saccharomyces cerevisiae*.

Chilled suspensions of commercial baker's yeast at ambient pH of 6-6.5, 7-10% solids, were homogenized by means of a Manton-Gaulin homogenizer at 8000 psig. The chilled homogenate was recycled through the homogenizer to give one, two or three passes. The homogenates were diluted with up to two volumes of water and adjusted in pH. The diluted homogenates were incubated for 5-60 minutes at 25°-60°C. and centrifuged. The nitrogen contents of the homogenates and supernates after centrifugation were measured by the Kjeldahl method. % N extractions were calculated.

| | Extraction Conditions | | | | |
|---|---|---|---|---|---|
| pH | % Solids Content | Time (min) | °C. Temp. | Number of Passes | % Nitrogen Extractability |
| 9.5 | 9.1 | 30 | 25 | 3 | 83 |
| 9.5 | 4.8 | 30 | 25 | 3 | 84 |
| 9.5 | 3.1 | 30 | 25 | 3 | 92 |
| 9.5 | 3.1 | 30 | 25 | 2 | 80 |
| 9.5 | 3.1 | 30 | 25 | 1 | 63 |
| 9.5 | 3-4 | 5 | 50 | 3 | 91 |
| 9.5 | 3-4 | 20 | 50 | 3 | 93 |
| 9.5 | -4 | 30 | 50 | 3 | 96 |
| 9.5 | 3-4 | 60 | 50 | 3 | 96 |
| 9.5 | 3-4 | 5 | 60 | 3 | 93 |
| 9.5 | 3-4 | 20 | 60 | 3 | 94 |
| 9.5 | 3-4 | 30 | 60 | 3 | 91 |
| 9.5 | 3-4 | 60 | 60 | 3 | 90 |
| 4.0 | 3-4 | 30 | 25 | 3 | 33 |
| 5.0 | 3-4 | 30 | 25 | 3 | 36 |
| 6.0 | 3-4 | 30 | 25 | 3 | 79 |
| 7.0 | 3-4 | 30 | 25 | 3 | 93 |
| 8.5 | 3-4 | 30 | 25 | 3 | 93 |
| 9.5 | 3-4 | 30 | 25 | 3 | 96 |
| 6.0 | 3-4 | 60 | 60 | 3 | 42 |
| 6.5 | 3-4 | 60 | 60 | 3 | 33 |
| 7.5 | 3-4 | 60 | 60 | 3 | 30 |
| 8.5 | 3-4 | 60 | 60 | 3 | 73 |
| 9.5 | 3-4 | 60 | 60 | 3 | 90 |

The data of Tables IIIA and IIIB show that extraction of the soluble nitrogenous materials can be carried out at least over the pH range of about 5.5 to about 11. Separation of cell wall residue and solubles is better at an extraction pH in the range of 7 to 10, with pH 9.5 considered the optimal balance between extraction and subsequent separation of the cell wall residue from the solubles. Extraction is best at a low solids content, but again a consideration of process rates led to the adoption of a solids content of about 2.5% to about 4%. Extraction time can be varied between about 5 and about 60 minutes at extraction temperature of about 0°C. to about 60°C., preferably about 25°C. to about 60°C. The best process rate of the subsequent separation of the cell wall residue from the solubles was obtained when the extraction was done at 60°C. for 5 to 20 minutes, at pH 9.5. With *Candida utilis* and *Saccharomyces cerevisiae*, each pass through the homogenizer improved the nitrogen extractability presumably by rupturing more cells, but, again, process rates and equipment must be considered. We prefer a three pass system as optimum for balancing all factors.

Taking N extractability and processing requirements into consideration, the optimal process to produce an extract of the soluble part of the yeast comprises the following steps: (1) growing a food grade yeast on a nutrient media, (2) harvesting and washing the yeast cells, (3) rupturing the yeast cells at a temperature of 0°-10°C. (4) handling the ruptured cells at pH 9.5, at 60°C. for 20 minutes, (5) removing the yeast insolubles at a temperature of about 60°C.

Factors that affect the utilization of the nuclease obtained from malt sprouts are those that are known to affect enzyme systems, namely, pH, temperature, time, substrate concentration, activators, and inhibitors. The effect of these factors were determined under actual use conditions (as opposed to neclease assay conditions). It may be noted that the nuclease assay incorporated $ZnCl_2$. However, the addition of $ZnCl_2$ to the alkali extract of yeast is not necessary. The interaction of some of these factors can be seen from Tables IV and V.

TABLE IV

Factors Affecting the Reduction of Nucleic Acid Content of Baker's Yeast Protein by Malt Sprout Nuclease A. Enzyme Level and Substrate Concentration A suspension of commercial baker's yeast at about 12% solids was homogenized by means of a Manton-Gaulin homogenizer. Three passes at 9,000 psig. pressure were done. The homogenate was diluted to about 4% solids adjusted to pH 9.5, and heated at 60°C. for 5 minutes. The diluted homogenate was centrifuged to produce the cell wall residue and an aqueous solution of the cytoplasmic constituents called the alkali extract. A nuclease preparation from malt sprouts was prepared by homogenizing 25 grams (dsb) of washed malt sprouts in 500 ml. water for 5 minutes in a Waring blendor, followed by high speed centrifugation to obtain the clarified extract containing the nuclease. Aliquots of the malt sprout extract were added to the alkali extract at pH 7, 50°C. After reacting for one hour, the digests were acidified to pH 4.5. The precipitated protein (IYP) was recovered by centrifugation, washed, and analyzed.

Nuclease is added at levels of at least about 50 units/gram of soluble solids. Up to about 1,500 units per gram or higher can be used depending on economics and flavor in the final product. The amount of nuclease added is the minimum amount that will give the desired RNA considering cost, flavor, process conditions, etc.

% Nucleic Acid in the Recovered IYP
Nuclease Units Added per Gram of Extract Solids

| % Solids in Alkaline Extract | 0 | 200 | 400 | 600 | 800 | 1000 | 2400 |
|---|---|---|---|---|---|---|---|
| 2 | 8.0 | 1.7 | 1.4 | 1.2 | 1.2 | 1.2 | X |
| 4 | 8.0 | 2.8 | 2.2 | 1.7 | 1.5 | 1.5 | 1.4 |

B. Effect of pH

The alkaline extract-malt sprout extract mixtures were adjusted to pH 5-10 prior to incubation. Reaction conditions were: one hour, 50°C., 2% solids, nuclease at 780 units per gram of extract solids. After incubation, the digests were adjusted to pH 4.5 and centrifuged to give the protein and the solubles called acid whey. The $A_{260}$ of the acid wheys was measured to obtain the nucleic acid content of the whey. The greater the nuclease activity, the greater the nucleic acid content of the whey, and the lesser the nucleic acid content of the IYP.

| pH | Nucleic Acid Hydrolysis % of Maximum |
|---|---|
| 5.0 | 84 |
| 6.0 | 100 |
| 7.0 | 93 |
| 8.0 | 84 |
| 9.0 | 70 |
| 10.0 | 21 |

Factors Affecting the Reduction of Nucleic Acid Content of Baker's Yeast Protein C. Effect of Time and Temperature The systems were adjusted to pH 7, and 30, 50 and 60°C.; 780 nuclease units were added per gram of yeast extract solids. Analysis were performed as described in Table III B.

| | Nucleic Acid Hydrolysis (% of Maximum) | | |
|---|---|---|---|
| | Temperature | | |
| Time | 30°C. | 50°C. | 60°C. |
| 30 min. | 12 | 57 | 85 |
| 60 | 13 | 86 | 88 |
| 120 | 15 | 92 | 94 |
| 180 | 16 | 96 | 100 |

TABLE V

Factors Affecting the Reduction of Nucleic Acid Content of *Candida utilis* Protein by Malt Sprout Nuclease A. Effect of Nuclease Concentration

*Candida utilis* biomass was prepared in fermentation by processes known to those versed in the art. The yeast biomass was harvested by centrifugation and washed twice with water. The yeast cells were ruptured using a Manton-Gaulin homogenizer. (3 passes at 9,000 psig pressure). Protein and other solubles were extracted from the homogenate by diluting with two volumes of water and stirring at pH 9.5 in the cold for 30 minutes at 5°C. The solubles were recovered (by centrifugation) as an alkali extract containing 1.73% solids.

The nuclease was extracted from commercial kiln dried malt sprouts. One part by weight of the malt sprouts was blended in a Waring blendor for 5 minutes with 10 volumes of water. The insoluble material was removed by screening or cheesecloth filtration; the liquid portion was collected. The residue was blended for 2-3 minutes with 5 volumes of water and filtered as before. The combined liquid portions of the two extracts were centrifuged to clarify the solution. The supernatant solution contained 2.1% total solids and 9.3 mg. of protein per ml. (N × 6.25). This solution was used as a source of enzyme. Somewhat less enzyme is extracted when the malt sprouts are not comminuted.

The hydrolysis of RNA in the yeast extract was carried out as follows. One volume of yeast extract was mixed with various volumes of malt sprout extract (final pH of the mixture was about 7-7.5) and incubated at 50°C. for 90 minutes. The solutions were cooled, adjusted to pH 4.5 with HCl and centrifuged. The precipitates (yeast isolates) were resuspended in water at pH 8 to 9 and analyzed for RNA (dry solids basis).

| Volume of Yeast Extract | Volume of Malt Sprout Extract | Volume of Water | % RNA in the Isolate |
|---|---|---|---|
| 150 ml. | 0 ml. | 75 ml. | 9.03 |
| 150 | 15 | 60 | 6.50 |
| 150 | 30 | 45 | 4.32 |
| 150 | 75 | 0 | 1.40 |

Factors Affecting the Reduction of Nucleic Acid Content of *Candida utilis* Protein by Malt Sprout Nuclease.

B. Effect of Incubation Time

Methodology is described in Table IV. One volume of alkali extract was incubated at 50°C., pH 7 with one-half volume of malt sprout extract for various periods.

| Incubation Time (minutes) | % RNA in Isolate |
|---|---|
| 0 | 8.21 |
| 15 | 2.11 |
| 30 | 1.33 |
| 45 | 1.59 |
| 60 | 1.45 |
| 75 | 1.27 |
| 90 | 1.39 |

Factors Affect the Reduction of Nucleic Acid Content of *Candida utilis* Protein by Malt Sprout Nuclease C. Effect of pH In a manner similar to the method presented in Table V A, the samples containing one volume of extract and one-half volume of malt sprout extract were adjusted to various pH's, and incubated at 50° C. for 60 min. After incubation, the mixtures were adjusted to pH 4.5 and centrifuged to give the yeast isolates which were analyzed for nucleic acid.

| Incubation pH | % RNA in Isolate |
|---|---|
| 6 | 1.37 |
| 7 | 1.36 |
| 8 | 1.26 |
| 9 | 5.54 |

The data presented in Tables IV and V show that the nuclease of malt sprouts reduces the nucleic acid content of the isolated protein product provided that the conditions of use are compatible with enzyme activity. The nuclease of malt sprouts can be used over the range of pH 5 to pH 10, but maximum activity occurs at pH 6 to pH 8. The optimum temperature for an enzyme process is that temperature at which the proper balance of activation and inactivation occurs. In general, we prefer to use the highest temperature that will produce the desired result. The nuclease of malt sprouts can be used over the range of 30°-60°C. The 60°C. temperature could be used provided that strict temperature control was available. The incubation time is adjusted to that time needed to reduce the nucleic acid content to the desired level. In general, the shorter the time, the lesser the opportunity for bacterial contamination. The amount of nuclease used is somewhat limited by the amount that can be extracted from malt sprouts, and the increase in process volume. The preferred time of incubation is less than about 4 hours.

After incubation the protein is insolubilized by adjusting pH to 2-6, preferably 3.5-5.5 The temperature is 0°-100°C. The protein is separated by filtering or centrifuging under the same conditions.

The following are detailed examples of this invention.

EXAMPLE I

Preparation of Yeast Protein from *Saccharomyces cerevisiae*

A chilled suspension of commercial baker's yeast containing 9.0% solids was homogenized by three passes through a Manton-Gaulin homogenizer. The homogenate was diluted to 3.4% solids and adjusted to pH 9.5 by the addition of sodium hydroxide. The homogenate was heated at 60°C. for 10 minutes. The cell walls were removed by centrifugation at 14,000 rcfg and analyzed. The cell walls made up 20.3% of the solids and 3.4% of the crude protein that was present in the homogenate, which means that 79.7% of the solids, and 96.6% of the crude protein of the yeast were rendered soluble into the alkali extract by the homogenization treatment.

Two hundred thirty (230) ml. of alkali extract at pH 9.35 containing 6.67 grams of solids including 4.54 grams of crude protein, 0.634 grams nucleic acid was adjusted to pH 4.5 by the addition of 2.65 ml. 4N hydrochloric acid. The protein product was recovered by ceentrifugation at 14,000 rcfg, resuspended and analyzed. 4.13 grams of solids including 3.50 grams crude protein, and 0.49 grams nucleic acid were recovered. The protein product contained 84.2% crude protein, 11.9% nucleic acid which we call a full RNA-IYP. The content of protein after correction for the nucleic acid is 72.1% (dsb) considering that corrected protein =

Crude Protein − (6.25 × (% Nucleic Acid)/6.13)

Thus, from 100 lbs. of yeast solids containing 49.8 lbs. of corrected protein, the full RNA protein product accounts for 48.9 lbs. of solids and 35.3 lbs. of corrected protein, i.e., 70% of the corrected protein present in the yeast was recovered in the protein product.

Another portion of the alkali extract was treated with an extract of malt sprouts. The malt sprout nuclease was prepared by blending washed malt sprouts for five minutes with twenty volumes of water. The blended material was filtered through cheesecloth and centrifuged to a sparkle extract containing 64 nuclease units per ml.

To 200 ml. of alkali extract containing 5.8 grams of solids including 3.92 g. crude protein and 0.55 grams nucleic acid was added 100 ml. of malt sprout extract and 1.15 ml. 4 N HCl to give pH 7. The 300 ml. were incubated at pH 7, 50°C., one hour, followed by adjustment with 1.3 ml. 4 N HCl to pH 4.5. The protein product was recovered by centrifugation at 14,000 rcfg, resuspended and when analyzed, contained 3.12 grams of dry solids including 2.48 grams of crude protein, and 0.08 grams nucleic acid. The protein product contained (dsb) 79.8% crude protein, 77.2% corrected protein, and 2.6% nucleic acid which we call a low RNA-IYP. Thus, from 100 lbs. of yeast solids containing 49.8 lbs. of corrected protein, the low RNA-IYP account for 42.4 lbs. of solids and 32.7 lbs. of corrected protein, i.e., 65.5% of the corrected protein present in the initial yeast was recovered in the low RNA-IYP protein product.

EXAMPLE II

Preparation of Yeast Protein from *Saccharomyces cerevisiae* (Pilot Plant)

Commercial baker's yeast was used as a source of *Saccharomyces cerevisiae*. The biomass was given three water washes and thickened by centrifugation to about 9% solids by weight.

Twenty gallons of this suspension containing 13.5 lbs. of solids, which was composed of 7.24 lbs. of crude protein, 1.01 lbs. nucleic acid, 0.81 lbs. of ash, 0.88 lbs. of lipid, and 4.58 lbs. of carbohydrate, was cooled to 45°F. and subjected to homogenization at a pressure of 8,000 PSIG whereafter it was cooled to 45°F. The homogenization was repeated for a total of three passes. The homogenate was diluted to a volume of 60 gallons with water. Sodium hydroxide was added until pH 9.5 was reached. About 0.5 liters of 10 N NaOH were needed. The material was agitated for fifteen minutes, heated to 140°F. and centrifuged. The 140°F. temperature facilitates separation of the insoluble cell walls and the solubles called the alkali extract. The insoluble cell walls contained 6.1 lbs. of solids. The remainder of the solids were in the alkali extract.

To 46 gallons of alkali extract containing 2.36% solids and 1.5% crude protein, was added sufficient hydrochloric acid to decrease to pH 7, 93 grams of zinc chloride, and 5,330 ml. of a nuclease preparation containing 650 nuclease units per ml. The nuclease dosage was 836 units per gram of extract solids. The system was incubated at 50°C. with addition of sodium hydroxide on demand to maintain pH 6.5. Samples were removed hourly for four hours for analysis. The samples (600 ml.) were immediately adjusted to pH 4.5 and centrifuged. In addition, at four hours, a portion was centrifuged without pH 4.5 adjustment. In all five samples, the yield of recovered solids and protein were uniform at 51-52% and 59-64% respectively, i.e., for every 100 lbs. of solids in the starting alkali extract, 51-52 lbs. of solids were recovered as IYP, and that for every 100 lbs. of crude protein in the starting alkali extract, 59-64 lbs. were recovered in the protein product. The content (dsb) of crude protein and nucleic acid were also uniform at 76-80% and 3.0-4.0% respectively.

The remainder of the digest in the pilot plant was adjusted to pH 4.5, centrifuged, washed once, and spray dried. The composition of the spray dried IYP was: (dsb) 74.8% crude protein, 72.6% corrected protein, 2.2% nucleic acid, 6.2% lipid, 3.8% ash, and 15.2% carbohydrate.

EXAMPLE III

Preparation of Yeast Protein from *Candida utilis*

*Candida utilis* biomass was produced in continuous fermentation upon a molasses substrate supplemented with a source of nitrogen and phosphate. The biomass was harvested by centrifugation and washed three times with water.

Fifty gallons of a suspension of *Candida utilis* biomass composed of 30.6 lbs. of yeast solids containing 15.1 lbs. of crude protein, 2.1 lbs. of nucleic acid, 2.0 lbs. of ash, 2.2 lbs. of lipid and 11.2 lbs. of carbohydrate were cooled to 45°F. and subjected to homogenization at a pressure of 8,000 PSIG whereafter it was cooled to 45°F. The homogenization was repeated for a total of three passes. The homogenate was diluted to a volume of 110 gallons with water and adjusted to pH 9.5 with sodium hydroxide. The material was agitated for 15 minutes, heated to 140°F. and centrifuged. The 140°F. temperature facilitates separation of the insoluble cell walls and the solubles (called the alkali extract). The separation yielded 12.5 lbs. of cell wall solids and an estimated 18.1 lbs. of alkali extract solids. The alkali extract was cooled to 122°F.

An extract of malt sprouts was prepared by mixing 50 lbs. pin-milled ground malt sprouts with 50 gallons of warm water for 30 minutes. Separation of the extract was effected with filter cloth bags by gravity draining followed by centrifugation. The solids content of the extract was 2.3%.

The extract of malt sprouts was added to the alkali extract as a level of one gallon of malt sprout extract to two gallons of alkali extract. About nine pounds of malt extract solids were added to eighteen pounds of alkali extract solids. The digest was adjusted to pH 7 with phosphoric acid and incubated for one hour with gentle agitation at 122°F.

The digest was adjusted to pH 4.5 with phosphoric acid and centrifuged into the insoluble protein product and the solubles (called the acid whey). The protein product was washed once. The washing removes 2.5 lbs. of solids. The yield of washed protein product was 9.9 lbs. of solids which was then spray dried. The composition of the spray dried protein product was (dsb): 69.0% crude protein, 1.1% nucleic acid, 6.7% lipid, 7.6% ash, and 16.7% carbohydrate (by difference). The protein content after correction for the nucleic acid content is 67.9%. The protein content obtained by subtracting the nucleic acid contribution to the crude protein is called the corrected protein content.

The yield of corrected protein can be calculated considering that the starting yeast contained 12.9 lbs. of corrected protein. The washed protein contained 6.72 lbs. of corrected protein for a yield of 52%.

The nutritional quality of unfractionated yeast and of isolated yeast protein has been measured. The results are presented in Table VI. These data show that the unfractionated, *Candida utilis*, the full RNA-IYP, and the low RNA-IYP made with malt sprout nuclease by our process are nutritionally equivalent on a protein basis. The PER is 65% that of ANRC casein. The alkali treatment to reduce the nucleic acid content reduced the nutritional quality of the isolated yeast protein, which could be compensated to some extent by feeding at a higher level.

TABLE VI

Nutritional Quality of Unfractionated *Candida utilis* and of Isolated Yeast Protein Isolated yeast protein was produced from *Candida utilis* in accordance with the process set forth in Example III. In addition, a second isolated yeast protein (full RNA-IYP) was prepared according to the process set forth in Example III except that the nuclease treatment was omitted. The isolated yeast proteins and the unfractionated yeasts were spray dried products.

| Material | Nucleic Acid Reduction Step | product Composition %(dsb) Corrected Protein[4] | Nucleic Acid | Level of Corrected Protein in the Diet | [5] PER |
|---|---|---|---|---|---|
| C. utilis - Unfractionated | None | 43.1 | 6.7 | 10.0 | 1.47, 1.70 1.62, 1.63 |
| C. utilis - Full RNA-IYP | None | 65.4 | 11.1 | 10.0 | 1.55, 1.60 |
| C. utilis - Low RNA-IYP | Malt Sprout[1] Nuclease | 67.2 | 1.4 | 10.0 | 1.64 |
| C. utilis - Low RNA-IYP | HTLA[2] | 70.0 | 2.0 | 10.0 | 0.71 |
| C. utilis - Low RNA-IYP | LTHA[3] | 71.0 | 2.0 | 10.0 | 0.41, 0.51 |
| do. | do. | do. | do. | 12.5 | 0.71 |
| do. | do. | do. | do. | 15.0 | 0.83 |

[1] According to the process described herein.
[2] A high temperature, low alkali (HTLA) process was used in which the alkali extract was made 0.025 N in NaOH to pH 10.5 and heated for four hours at 80°F. The protein was isolated after adjusting the system to pH 4.5. This process is described in a copending application of Newell et al entitled THE MANUFACTURE OF YEAST PROTEIN ISOLATE HAVING REDUCED NUCLEIC ACID CONTENT BY ALKALI PROCESS.
[3] Low temperature, high alkali (LTHA) process in which the alkali extract was made 0.1 N in NaOH to pH 12 and heated for two hours at 60°C. The protein was isolated after adjusting the system to pH 4.5. This process is described in a copending application of Newell et al entitled THE MANUFACTURE OF YEAST PROTEIN ISOLATE HAVING REDUCED NUCLEIC ACID CONTENT BY ALKALI PROCESS.
[4] Corrected protein = 6.25 (Total nitrogen by Kjeldahl - % Nucleic Acid Content)/6.13
[5] The Protein Equivalence Ratio (PER) was measured at WARF Institute, Inc. of Madison, Wisconsin using a level of 10% corrected protein in the diet and calculated to ANRC casein at PER = 2.5 fed at the 10% level. The PER at 7.5% casein was 2.40 compared to 2.50 at the 10% level. The actual test procedure is published in Official Methods of Analysis of the A.E.A.C., p. 800, 11th Edition (1970).

Furthermore, the reduction of the nucleic acid content of the IYP by our nuclease process does not alter the amino acid pattern compared to the full RNA-IYP (Table VII). The isolated yeast protein produced by our nuclease process is especially rich in all of the essential amino acids except for the sulfur containing amino acids. Except for methionine and cystine, the contents of the essential amino acid in isolated yeast protein made by our nuclease process exceeds that cited for the FAO reference protein and meets or exceeds that needed for the growing rat.

The low RNA-IYP made by the LTHA and HTLA process is also lacking in the content of sulfur and methionine, but exceeds the FAO pattern for the other essential amino acids. The essential amino acid requirements are also met, or exceeded except for methionine, cystine, and lysine. A comparison of the methionine, cystine, and lysine contents of the diet containing 7.5 casein to that of a diet containing 15% low RNA-IYP made by the LTHA process shows that the latter diet contains more methionine, cystine and lysine than the 7.5% casein diet, but the PER of the 7.5% casein diet is greater. This observation is added evidence of a detrimental effect of alkali on protein nutritional quality that cannot be ascertained by amino acid analysis.

TABLE VII

Essential Amino Acid Composition of Isolated Yeast Protein from
*Candida utilis*

| Amino Acid[1] | Method of Nucleic Acid Reduction | | | | ANRC Casein[2] | FAO[3] Amino Acid Pattern | Amino Acid[4] Pattern Required by the Growing Rat |
|---|---|---|---|---|---|---|---|
| | None | Nuclease | LTHA | TLA | | | |
| Lysine | 9.56 | 8.70 | 8.12 | 7.86 | 8.0 | 4.2 | 9.0 |
| Methionine | 1.32 | 1.36 | 1.41 | 1.30 | 2.84 | 2.2 | 1.6 |
| Cystine | 1.28 | 1.34 | 0.56 | 0.42 | 0.52 | 2.0 | 3.4 |
| Threonine | 5.42 | 5.40 | 4.95 | 5.05 | 3.52 | 2.8 | 5.0 |
| Tryptophan | 1.35 | 1.53 | 1.47 | 1.39 | 1.27 | 1.4 | 1.1 |
| Valine | 6.46 | 6.60 | 6.38 | 6.34 | 7.12 | 4.2 | 5.5 |
| Phenylalanine | 5.26 | 5.57 | 5.4 | 5.32 | 5.02 | 2.8 | 4.2 |
| Leucine | 9.48 | 9.68 | 9.34 | 9.26 | 9.65 | 4.8 | 7.0 |
| Isoleucine | 6.06 | 6.05 | 5.70 | 5.80 | 4.85 | 4.2 | 5.5 |
| Tyrosine | 4.59 | 4.85 | 4.42 | 4.74 | 5.55 | 2.8 | 3.0 |
| Histidine | 3.20 | 2.67 | 2.54 | 2.38 | 3.20 | X | 2.5 |
| PER | 1.55 | 1.64 | 0.41 | 0.71 | 2.5 | X | X |

[1] The methionine and cystine content were determined by microbiological assay by WARF, Inc., the remaining amino acids were measured by the amino acid analyzer at WARF, Inc.
[2] The reference casein used in PER tests reported in Table VI.
[3] FAO Committee on Protein Requirements (1957 b) "FAO Nutritional Studies" No. 16.
[4] P.B. Ram Rao, H.W. Norton, and B. Connor Johnson, J. Nutrition, 82 p. 88 (1964).

What is claimed is:

1. A process for producing a yeast protein product comprising the steps of:
    a. Rupturing yeast cells,
    b. Separating a solubles fraction containing nucleic acid and protein from an insoluble cell wall debris fraction,
    c. Adding nuclease to the solubles fraction,
    d. Hydrolyzing the nucleic acid with the added nuclease at a pH of about 5 to about 10 and a temperature of about 30° to about 60°C. for up to four hours, and
    e. Separating an insoluble fraction containing said protein from a soluble fraction containing said nucleic acid.

2. The process of claim 1 wherein the yeast cells are ruptured by homogenization below about 50°C.

3. The process of claim 1 including the step of extracting the ruptured yeast cells at a pH between 6 and 11 and a temperature between 25°C. and 60°C. for 5 to 60 minutes before separating into the solubles fraction and the insoluble cell wall fractions.

4. The process of claim 3 wherein the ruptured yeast cells are extracted at pH 9.5 at a temperature between 25°C. and 60°C. for 5 to 60 minutes.

5. The process of claim 3 wherein the pH yeast cells are extracted at ph 9.5, 60°C. for 30 minutes.

6. The process of claim 3 wherein the solubles fraction after the separation of the cell wall debris is treated with the nuclease preparation at pH 5 to pH 10, at temperatures between 30° and 60°C., for a time less than four hours.

7. The process of claim 6 wherein the protein fraction is separated from the nucleic acid fraction by centrifugation at pH 4.5-8.0 at a temp. of not greater than 60°C.

8. The process of claim 7 wherein the nuclease is derived from malt sprouts.

9. The process of claim 1 wherein the insoluble cell wall material is separated by centrifugation.

10. The process of claim 1 wherein the solubles fraction after the separation of the cell wall debris is treated with the nuclease preparation at pH 5 to pH 10, at temperatures between 30° and 60°C., for a time less than 4 hours.

11. The process of claim 10 wherein the solubles fraction after the separation of the cell wall debris is treated with the nuclease preparation at pH 7, 50°C.

12. The process of claim 1 wherein the protein fraction is separated from the nucleic acid fraction by centrifugation at pH 4.5-8.0 at a temp. of not greater than 60°C.

13. The process of claim 1 wherein the nuclease is derived from malt sprouts.

14. The process of claim 1 including the step of recovering a yeast protein product comprising:
    about 65% to about 85% protein;
    about 0.5% to about 9% RNA;
    about 7% to about 15% lipid; about 1 to about 5% ash; about 5 to about 20% carbohydrate; and about 0 to about 1% fiber.

15. The process of claim 14 wherein the recovered yeast protein contains less than about 5% RNA.

16. The process of claim 14 wherein the recovered yeast protein contains less than about 3% RNA.

17. The process of claim 1 wherein the yeast is selected from *Candida utilis* and *Saccharomyces cerevisiae*.

* * * * *